United States Patent
Engelen et al.

(10) Patent No.: US 10,541,752 B2
(45) Date of Patent: Jan. 21, 2020

(54) ASSOCIATING A MOBILE DEVICE WITH A GROUP

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/335,890

(22) PCT Filed: Sep. 19, 2017

(86) PCT No.: PCT/EP2017/073616
§ 371 (c)(1),
(2) Date: Mar. 22, 2019

(87) PCT Pub. No.: WO2018/054894
PCT Pub. Date: Mar. 29, 2018

(65) Prior Publication Data
US 2019/0215062 A1 Jul. 11, 2019

(30) Foreign Application Priority Data

Sep. 22, 2016 (EP) ..................... 16190019
Sep. 29, 2016 (EP) ..................... 16191427

(51) Int. Cl.
*H04B 10/116* (2013.01)
*H04W 4/08* (2009.01)
*H04W 4/80* (2018.01)

(52) U.S. Cl.
CPC ............ *H04B 10/116* (2013.01); *H04W 4/08* (2013.01); *H04W 4/80* (2018.02)

(58) Field of Classification Search
CPC ..... H04B 10/114; H04B 10/116; H04W 4/08; H04W 4/70; H04W 4/80
See application file for complete search history.

(56) References Cited

U.S. PATENT DOCUMENTS 8,957,951 B1   2/2015  Ganick et al.
2014/0056172 A1  2/2014  Lee et al.
(Continued)

FOREIGN PATENT DOCUMENTS

WO   2015173001 A1   11/2015
WO   2018091341 A1   5/2018

*Primary Examiner* — Mina M Shalaby
(74) *Attorney, Agent, or Firm* — Meenakshy Chakravorty

(57) ABSTRACT

A lighting system comprises at least one light source (1,3), a mobile system, e.g. a mobile device (5), and at least one further device (6-8). The mobile system comprises a light sensor (11), a communication interface (12) and a processor (13). The mobile system is configured to receive from a light source (1) a light emission (2) in which an identifier has been encoded, e.g. using Visible Light Communication (VLC) techniques, and to determine the identifier from the light emission (2). The identifier is associated with a group of devices that does not comprise mobile devices that are not receiving a light emission in which this identifier has been encoded. The mobile system is configured to join this group and to communicate with at least one further device (6) from this group of devices (5,6).

15 Claims, 7 Drawing Sheets

(56) References Cited

U.S. PATENT DOCUMENTS

| | | | |
|---|---|---|---|
| 2014/0241354 A1* | 8/2014 | Shuman | H04L 67/16 370/390 |
| 2014/0255036 A1 | 9/2014 | Jovicic et al. | |
| 2015/0141005 A1* | 5/2015 | Suryavanshi | H04L 67/125 455/434 |
| 2015/0327010 A1* | 11/2015 | Gottschalk | G06F 17/50 455/456.1 |
| 2018/0024811 A1 | 1/2018 | De Vaan et al. | |

* cited by examiner

ASSOCIATING A MOBILE DEVICE WITH A GROUP

CROSS-REFERENCE TO PRIOR APPLICATIONS

This application is the U.S. National Phase application under 35 U.S.C. § 371 of International Application No. PCT/EP2017/073616, filed on Sep. 19, 2017, which claims the benefit of European Patent Application No. 16190019.6, filed on Sep. 22, 2016 and European Patent Application No. 16191427.0, filed on Sep. 29, 2016. These applications are hereby incorporated by reference herein.

FIELD OF THE INVENTION

The invention relates to a mobile system and a group controller.

The invention further relates to a method of joining a group of devices and a method of associating a mobile device with a group of devices.

The invention also relates to a computer program product enabling a computer system to perform any of such methods.

BACKGROUND OF THE INVENTION

US 2014/0056172 A1 discloses a method for joining a communication group by receiving and processing light and/or sound signals in a mobile device. A mobile device may receive light and/or sound signals with sensors, such as cameras and/or microphones, and may process the light and/or sound signals to obtain information encoded with the signals. The mobile device may decode detected signaling information and identify connectivity data that may be used to join and transmit messages to the communication group. Examples of communication groups may include websites and social media forums.

A drawback of the prior art method is that the communication groups are grouped in such a way as to allow persons with shared interests to communicate and this grouping is not always sufficient or desired. In particular, there is no means to limit the communication group to devices that remain physically present, or to give a single device control over transaction in the communication group (e.g. single access to a vending machine).

US 2015/0141005 A1 discloses a mobile device to perform actions associated with applications when confirmed to be within proximity of a physical location relevant to the applications. The mobile device identifies a unique identifier of a proximate wireless network access point, determines whether the unique identifier matches a predefined identifier stored on the mobile device and associated with an application, obtains sensor data via a sensor in response to determining that the unique identifier matches the predefined identifier, processes the obtained sensor data to identify encoded information, determines whether the encoded information within the obtained sensor data is associated with the unique identifier and performs an action based on the encoded information in response to determining that the encoded information is associated with the unique identifier. The mobile device may in-dude microphones that may capture acoustic signals and/or cameras that may capture light signals as the sensor data. Using this combination of detecting unique identifiers and re-ceived proximally-relevant information, the mobile device may automatically perform prox-imally-relevant operations, such as transmitting requests to join communication groups that are relevant to the user's particular location. Because proximity and relevance to applications on the mobile device is confirmed, unintended actions may be avoided, such as participation of unregistered devices in a meeting via an application that is localized to a specification location (or a highly local position).

SUMMARY OF THE INVENTION

It is a first object of the invention to provide a mobile system, which is capable of joining a group of nearby devices.

It is a second object of the invention to provide a group controller, which is capable of controlling a group of nearby devices.

It is a third object of the invention to provide a method of joining a group of devices, which allows a mobile device to join a group of nearby devices.

It is a fourth object of the invention to provide a method of associating a mobile device with a group of devices, which allows a group controller to control a group of nearby devices.

In a first aspect of the invention, the mobile system comprises a light sensor, a communication interface and at least one processor configured to use said light sensor to receive a light emission, direct or indirect, from a light source, to determine an identifier from said light emission, said identifier being associated with a group of devices, said group of devices comprising mobile devices which are receiving a light emission with said identifier, to join said group of devices, and to use said communication interface to communicate with at least one further device from said group of devices. The at least one processor may be further configured to leave said group of devices when said light sensor is no longer receiving said light emission with said identifier.

The inventors have recognized that by using light sources, e.g. Visible Light Communication (VLC), to broadcast identifiers, the mobile device can join a group of nearby devices that receive a light emission with the same identifier, e.g. a group that comprises nearby smartphones, nearby speakers or a nearby vending machine, and communicate with one or more devices of this group, e.g. transfer files to a nearby smartphone or purchase an item from a nearby vending machine.

The group of devices may not exist yet when the mobile system wants to join the group of devices. The mobile system may create the group of devices itself before joining.

The light emission may comprise highly directional, collimated light effects or diffuse or wide-angle light effects (such as generated by LEDs without any optics), for example. The light sensor may receive the light emission directly from the light source, i.e. when the light sensor is looking at the light source, or indirectly from another device or other surface that reflects the light emission that shines on its surface, i.e. when the light sensor is looking at the light effects. The mobile system may communicate directly with the at least one further device from the group of devices, e.g. the devices may pair using Bluetooth, ZigBee or Wi-Fi, or the devices may communicate via another device, e.g. via a group controller. Communication with the at least one further device of the group of devices may comprise transmission and/or reception. When no separate group controller is used, the mobile system may create the group itself before joining the group. The mobile device may act as a group controller.

The mobile system may comprise one or more mobile devices. An example of the latter is a mobile system comprising a smart watch or a pair of smart glasses and a smartphone. The smart watch or pair of smart glasses may receive the light emission, determine the identifier from the light emission and communicate the identifier to the smartphone, e.g. wirelessly. The smartphone may become part of the group and communicate with the at least one further device from the group of devices.

Said at least one processor may be further configured to use said light sensor to receive a further light emission, to determine a further identifier from said further light emission and to leave said group of devices if said further identifier is different from an identifier associated with said group. By leaving the group when the further identifier is different from the identifier associated with the group, the mobile system helps ensure that the group of devices comprises no mobile devices which are not receiving the light emission. If the group is controlled by a group controller other than the mobile system, the identifier associated with the group may be different from the identifier determined when the mobile system (e.g. one of the mobile devices of the mobile system) joined the group. The mobile system may send the further identifier to the group controller or may request the current group identifier from the group controller to check whether the further identifier is different from the current group identifier.

Said at least one processor may be further configured to use said light sensor to receive a further light emission, to determine a further identifier from said further light emission and to transmit said further identifier to a group controller. By transmitting the further identifier to the group controller, the group controller may check, for example, whether the further identifier is different from the current group identifier, as explained in the previous paragraph. When the further identifier is different from the current group identifier, the group controller may remove the mobile system, e.g. one of the mobile devices of the mobile system, from the group and inform the mobile system accordingly. The group controller may also remove the mobile system from the group if the identifier associated with the group has changed and the mobile system does not transmit the new identifier to the group controller within a certain period of time.

Said at least one processor may be further configured to use said communication interface to receive a foreign identifier from a further device and to join or allow said further device to join a group comprising (after said joining) at least one mobile device of said mobile system and said further device when said identifier and said foreign identifier are equal. Devices can connect to each other without a group controller, e.g. by having at least one of the devices send the identifier that has determined by or for it to at least one other device. For example, a Bluetooth device may be able to include the identifier determined from the light emission in the broadcast message in which it advertises its presence. Devices may form a group when the foreign identifier, i.e. the identifier determined by the further device, and the identifier determined by the mobile system are equal.

Said at least one processor may be further configured to use said communication interface to determine a list of nearby devices and to select one or more devices which are both in said group of devices and in said list of nearby devices. For example, the mobile system may be able to find Bluetooth devices within communication range and/or Wi-Fi devices using the same Wi-Fi access point and filter out any devices that do not receive a light emission with the same identifier.

Said at least one processor may be further configured to use said communication interface to transmit said identifier to a group controller. This allows the group controller to send a list of devices which are receiving a light emission with the same identifier to the mobile system, as described in the next paragraph.

Said at least one processor may be further configured to use said communication interface to receive from the group controller a list of devices which are receiving a light emission with said identifier. In this way, the mobile system does not need to perform a discovery phase in which it looks for devices within communication range. The mobile system may be able to communicate with these devices via the group controller or it may be assumed that the mobile system is able to communicate with these devices directly.

Said at least one processor may be further configured to request an access code for use with said at least one further device from the group controller. The access code may be required by the at least one further device in order to identify which mobile device is communicating with it and/or in order to ensure that only one mobile device can communicate with it during a single transaction, e.g. when a user purchases an item from a vending machine. The request may comprise a public (encryption) key associated with the mobile system, e.g. with one of the mobile devices of the mobile system, or its user and the access code may be transmitted, e.g. via Wi-Fi or Bluetooth or via the light source, to the mobile system encrypted using this public key.

Said at least one processor may be further configured to use said communication interface to send a request to have said light source transmit a different light emission with a different identifier. This allows the mobile system to check whether all devices in the group still receive a light emission with the same identifier, e.g. when the user of the mobile system is a meeting organizer. The mobile system may be able to transmit the request directly to the light source or may be able to transmit the request via another device, e.g. via a device that performs access control.

Said at least one processor may be further configured to determine from said light emission which application to start and to start said determined application. An example of such an application is a roulette application that is started when the mobile system is near a (certain) roulette table. The at least one processor may be configured to determine which application to start from the identifier determined from the light emission or from another (e.g. application-specific) identifier determined from the same light emission, for example.

In a second aspect of the invention, the group controller comprises a receiver, a transmitter, storage means and at least one processor configured to use said receiver to receive from a mobile device an identifier determined from a light emission, to associate said mobile device with a group of devices on said storage means, said group of devices being associated with said identifier and comprising mobile devices which are receiving a light emission with said identifier, and to use said transmitter to facilitate communication between said mobile device and at least one further device from said group of devices. The at least one processor may be further configured to disassociate said mobile device with said group of devices on said storage means when said mobile device is no longer receiving the light emission with said identifier.

Communication may be facilitated by forwarding communication from the mobile device to the at least one further device or by sending a list of devices in the group of devices to the mobile device, for example. Communication may be forwarded to the at least one further device in order to control the at least one further device, e.g. when the at least one further device is a vending machine or controls the infrastructure of a meeting room. Communication may be forwarded via Wi-Fi or Bluetooth or via a light source. The mobile device described in the previous paragraphs may act like a group controller, e.g. when no separate group controller is available.

Said at least one processor may be further configured to use said transmitter to send a list of devices which are in said group of devices to said mobile device. This allows the mobile device to contact the at least one further device directly, e.g. via Wi-Fi, ZigBee or Bluetooth.

Said at least one processor may be further configured to use said transmitter to instruct a light source to transmit a different light emission. This enables the functionality described in the next paragraphs.

Said at least one processor may be configured to use said transmitter to instruct a light source to transmit a different light emission with a different identifier. This allows the group controller to confirm whether the devices in the group still receive a light emission with the same identifier. Said at least one processor may be configured to remove said association between said mobile device and said group of devices on said storage means when said different identifier is not received from said mobile device within a certain period of time.

Said at least one processor may be configured to use said transmitter to instruct a light source to transmit a different light emission with a transaction request. This allows the group controller to effect a transaction even when the at least one further device is not connected to a (e.g. Wi-Fi, Bluetooth, ZigBee or Ethernet) network. The transaction request may comprise a request to purchase or release (e.g. if the controller ensures payment) an item from a vending machine, for example.

In a third aspect of the invention, the method of joining a group of devices comprises the steps of using a light sensor to receive a light emission from a light source, determining an identifier from said light emission, said identifier being associated with a group of devices, said group of devices comprising mobile devices which are receiving a light emission with said identifier, joining said group of devices, and communicating with at least one further device from said group of devices. The method may further comprise the step of leaving said group of devices when said light sensor is no longer receiving said light emission with said identifier In a fourth aspect of the invention, the method of associating a mobile device with a group of devices comprises the steps of receiving from a mobile device an identifier determined from a light emission, associating said mobile device with a group of devices on a storage means, said group of devices being associated with said identifier and comprising no mobile devices which are not receiving a light emission with said identifier, and using a transmitter to facilitate communication between said mobile device and at least one further device from said group of devices. The method may further comprise the step of disassociating said mobile device with said group of devices on said storage means when said mobile device is no longer receiving the light emission with said identifier.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: using a light sensor to receive a light emission from a light source, determining an identifier from said light emission, said identifier being associated with a group of devices, said group of devices comprising mobile devices which are receiving a light emission with said identifier, joining said group of devices, and communicating with at least one further device from said group of devices. The software code portion may be further configured for leaving said group of devices when said light sensor is no longer receiving said light emission with said identifier The same or a different non-transitory computer-readable storage medium stores at least one further software code portion, the further software code portion, when executed or processed by a computer, being configured to perform executable operations comprising: receiving from a mobile device an identifier determined from a light emission, associating said mobile device with a group of devices on a storage means, said group of devices being associated with said identifier and comprising mobile devices which are receiving a light emission with said identifier, and using a transmitter to facilitate communication between said mobile device and at least one further device from said group of devices. The further software code portion may be further configured for disassociating said mobile device with said group of devices on said storage means when said mobile device is no longer receiving the light emission with said identifier.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present nvention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
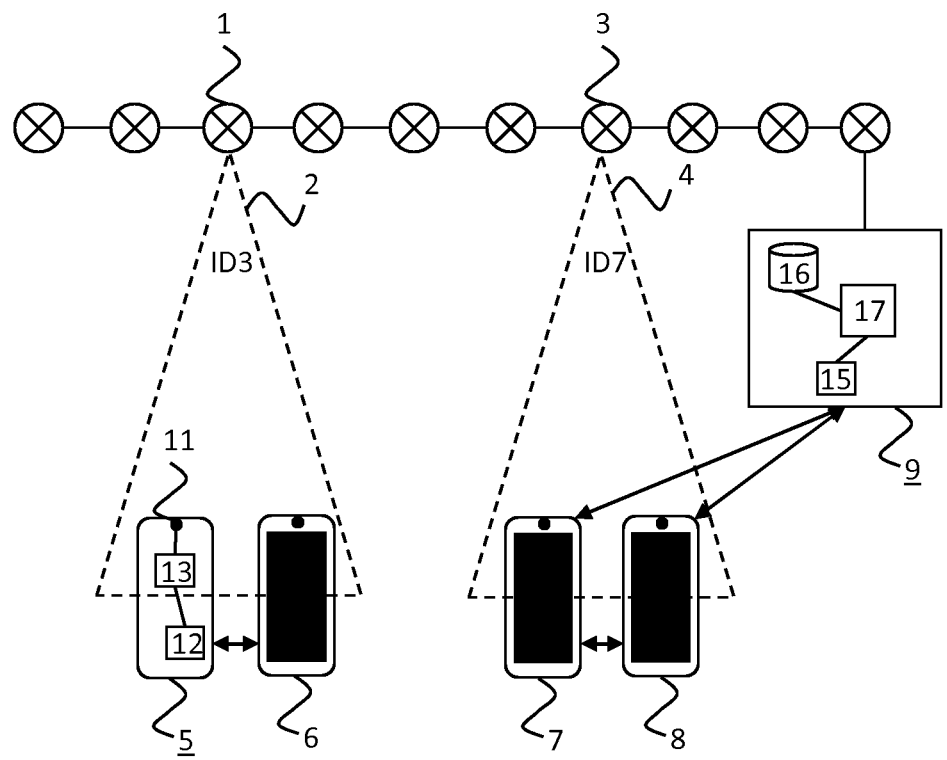
FIG. 1 is a block diagram of a first embodiment of a lighting system comprising mobile devices and a group controller.

FIG. 1 shows a first embodiment of a lighting system comprising ten light sources, including a light source 1 and a light source 3, mobile devices 5, 6, 7 and 8, and a group controller 9. Light source 1 emits a light emission 2 and light source 3 emits a light emission 4.

The mobile device 5 comprises a light sensor 11, a communication interface 12, and a processor 13. The processor 13 is configured to use the light sensor 11 to receive a light emission 2 from the light source 1 and to determine an identifier (ID3), from the light emission 2. The identifier is associated with a group of devices. The group of devices comprises no mobile devices which are not receiving a light emission with the identifier. The processor 13 is further configured to join the group of devices and to use the communication interface 12 to communicate with mobile device 6 from the group of devices. Mobile devices 6, 7 and 8 also comprise these three components.

The group of devices may alternatively or additionally comprise one or more devices that are not mobile. FIG. 1 shows the mobile devices 5 and 6 receiving light emission 2 directly from light source 1 and mobile devices 7 and 8 receiving light emission 4 directly from light source 3. Mobile devices may also receive light emissions reflected by surfaces of other devices, e.g. a light emission reflected by a vending machine. It is possible to have multiple light sources produce the same light identifier (e.g. in a single room) so that devices pointing at any of the light sources may pair with any other device that points at the same or a different light source that produces the same identifier.

In the embodiment shown in FIG. 1, the mobile device 5 comprises one processor 13. In an alternative embodiment, the mobile device 5 comprises multiple processors. The communication interface 12 of the mobile device 5 may use WiFi, Bluetooth, Zigbee and/or Ethernet to communicate with the mobile device 6 and with other devices, for example. The communication interface 12 may comprise multiple hardware components, e.g. a separate receiver and transmitter. The communication interface 12 may comprise a transceiver, for example. The processor 13 of the mobile device 5 may be a general-purpose processor, e.g. an ARM or a Qualcomm processor, or an application-specific processor. The mobile device 5 may comprise other components typical for a mobile device, e.g. a random access memory and a battery. The light sensor 11 may comprise a diode, for example.

In this embodiment, the processor 13 of the mobile device 5 is further configured to use the light sensor 11 to receive a further light emission, to determine a further identifier from the further light emission and to leave the group of devices if the further identifier is different from an identifier associated with the group. For example, when the mobile device 5 moves from inside light emission 2 into further light emission 4, it starts receiving further identifier ID7 instead of identifier ID3 and leaves the group associated with identifier ID3 and joins the group associated with further identifier ID7. The processor 13 of the mobile device 5 is also configured to leave the group of devices when no light emission is received for at least a certain period of time.

Although the invention does not require a (separate) group controller, use of a (separate) group controller, e.g. part of the lighting infrastructure, has benefits, e.g. provides better security. Mobile devices 7 and 8 communicate with the group controller 9.

The group controller 9 comprises a transceiver 15, storage means 16, and a processor 17 configured to use the transceiver 15 to receive from the mobile device 7 an identifier determined from a light emission 4, to associate the mobile device 7 with a group of devices on the storage means 16, the group of devices being associated with the identifier and comprising no mobile devices which are not receiving a light emission with the identifier, and to use the transceiver 15 to facilitate communication between the mobile device 7 and at least one further device 8 from the group of devices.

In the embodiment shown in FIG. 1, the group controller 9 comprises one processor 17. In an alternative embodiment, the group controller 9 comprises multiple processors. In the embodiment shown in FIG. 1, a receiver and a transmitter are combined in the transceiver 15 of the group controller 9. In an alternative embodiment, the group controller 9 comprises a receiver and a transmitter that are separate.

The transceiver 15 of the group controller 9 may use Wi-Fi, Zigbee or Bluetooth to communicate with the mobile devices 7 and 8, for example. The processor 17 of the group controller 9 is preferably a general-purpose processor, e.g. an Intel or an AMD processor. The processor 17 of the group controller 9 may comprise multiple cores, for example. The processor 17 of the group controller 9 may run a Unix-based or Windows operating system, for example. The group controller 9 may comprise other components typical for a controller, e.g. a power supply and a random access memory.

The processor 13 of the mobile device 7 is further configured to use the communication interface 12 transmit the identifier and information relating to the mobile device 7 and/or its owner/user to the group controller 9. The processor 17 of the group controller 9 is further configured to use the transmitter 15 to send a list of devices in the group of devices to the mobile device 7. This list of devices includes mobile device 8 and may include mobile device 7. The processor 13 of the mobile device 7 is further configured to use the communication interface 12 to receive this list from the group controller 9. The user of the mobile device 7 may be asked whether he trusts the received list or may be able to preconfigure when a received list should be trusted, for example.

A mobile device may leave a group voluntarily or may be forced to leave a group:
  When the mobile device is not receiving a light emission with the identifier, the mobile device may leave the group voluntarily.
  After some time, the mobile device may be forced to leave the group by the group controller.
  When the mobile device is not receiving a light emission with the identifier, the group controller forces the mobile device to leave. To detect this, the group controller updates the light identifier regularly and asks the mobile devices to send the updated identifier. When the mobile device is not receiving a light emission with the updated identifier, the mobile device cannot determine the updated identifier and the group controller removes the mobile device from the group.
  Another device (e.g. of the organizer of a meeting) may be able to delete mobile devices from the list or request the group controller to update the light identifier and check if mobile devices are receiving the updated identifier.

In an embodiment, the processor 13 of the mobile device 5 may be further configured to use the communication interface 12 to determine a list of nearby devices and to select one or more devices which are both in the group of devices and in the list of nearby devices. Determining the set of nearby devices may be done based on additional input indicative of a (relative) location, such as devices which are connected to the same WiFi network, are within Bluetooth range, or are located at nearby GPS locations.

Mobile devices 5 and 6 do not communicate with a separate group controller. In an embodiment, the processor 13 of the mobile device 5 is further configured to use the communication interface 12 to receive a foreign (i.e. external to mobile device 5) identifier from the mobile device 6, e.g. a foreign identifier broadcast by mobile device 6 or a foreign identifier sent by mobile device 6 in response to a query broadcast by mobile device 5, and to join or allow the mobile device 6 to join a group comprising at least the mobile device 5 and the mobile device 6 when the identifier and the foreign identifier are equal (for example, both identifiers are ID3, as shown in FIG. 1).

So mobile device 5 detects mobile devices 6-8 and receives the identifiers determined by these mobile devices from the light emission received by them. Every mobile device filters the list of relevant devices to those that have detected the same light identifier (ID3 in case of mobile device 5). When mobile device 5 moves to an area where it receives light emission 4 (and determines ID7 from this light emission 4), it leaves its current group and joins a different group.

For instance, if a user wants to use his mobile device to set up a connection to one of many available Bluetooth loudspeakers in his house, the presented list of available Bluetooth connected speakers may be limited to those with the same light identifier, thereby making it easy for the user to select the one which is near. Instead of a presented list, the connection may also be established directly such that the music starts playing on the nearby loudspeaker. A user may easily extend his audio experience by directing his mobile device to other loudspeakers that he wishes to include. By doing this, his mobile device receives additional light identifiers reflected by the surface of the loudspeakers and associated with those target loudspeakers such that those can easily be included in the audio rendering as well. If all lamps encode the same identifier in their light emissions in the room, all speakers in the room are connected at once. If every speaker is lit by a different lamp with different light identifier, the mobile device has to point to every speaker to include it in the list of playback devices.

In another example, a group of friends may use a friend finder app. For a first rough indication of proximity, GPS or WiFi networks may be used. For the close proximity finding, however, equal light identifiers may be detected. Next to facilitating friends to find each other, this may also be useful when users want to set up ad hoc connection to quickly share some content with each other such as a photo that has been taken. For instance, someone has taken a photo and wants to share this with his friend who is with him, instead of presenting a longlist of possible contacts or friends, his mobile device may only present the contact(s) of those who have a mobile device that has detected one or multiple light identifiers equal to the light identifiers detected by the mobile device of the user or order the longlist of friends so that those who have a mobile device that has detected one or multiple light identifiers equal to the light identifiers detected by the mobile device of the user are presented first. The same principle may be applied when ad hoc connecting to peripheral devices (such as a loudspeaker or a keyboard, e.g. using Bluetooth) whereby the list of available devices is limited to or ordered based on the detection of same light identifier(s).

In the examples above, the connection or pairing with nearby devices which have detected the same light identifiers can either be established automatically, or alternatively can be established after confirmation of the user(s). For instance, the user can be presented with a list of devices or associated users to connect with and select one of them.

In an embodiment, the processor 17 of the group controller 9 is configured to use the transceiver 15 to instruct the light source 3 to transmit a different light emission. The different light emission may encode a different identifier and the processor 13 of the mobile device 7 may be further configured to use the light sensor 11 to receive a further light emission, i.e. the different light emission, to determine a further identifier, i.e. the different identifier, from the further light emission and to transmit the further identifier to the group controller 9. This allows the group controller 9 to check, for example, whether the mobile device 7 is still receiving a light emission from light source 3.

The processor 13 of the mobile device 7 may be further configured to send a request to group controller 9 to perform such a check, e.g. if the mobile device 7 is used by a meeting organizer. If no group controller is used, the processor 13, e.g. of the mobile device 5, may be further configured to use the communication interface 12 to send a request to the light source directly to transmit a different light emission with a different identifier.

In the embodiment of FIG. 1, each of the mobile devices 5 to 8 comprises a light sensor 11. In an alternative embodiment, the light sensor 11 of a mobile device may be part of another device connected to the mobile device. The mobile device may be a smart phone, for example, and the other device may be a smart watch or pair of smart glasses, for example.

Figure 2:
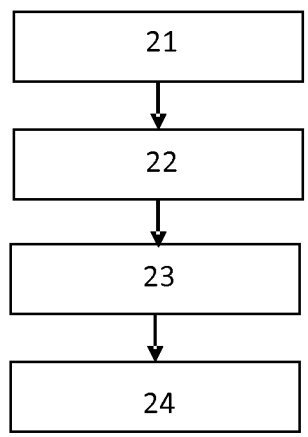
FIG. 2 is a flow diagram of a first embodiment of the methods of associating a mobile device with a group of devices.

The method of joining a group of devices comprises four steps, see FIG. 2. A step 21 comprises using a light sensor to receive a light emission from a light source. A step 22 comprises determining an identifier from the light emission, the identifier being associated with a group of devices, the group of devices comprising no mobile devices which are not receiving a light emission with the identifier. A step 23 comprises joining the group of devices. A step 24 comprises communicating with at least one further device from the group of devices. In this embodiment, no separate group controller is used. One of the mobile devices in the group may control the group.

Figure 3:
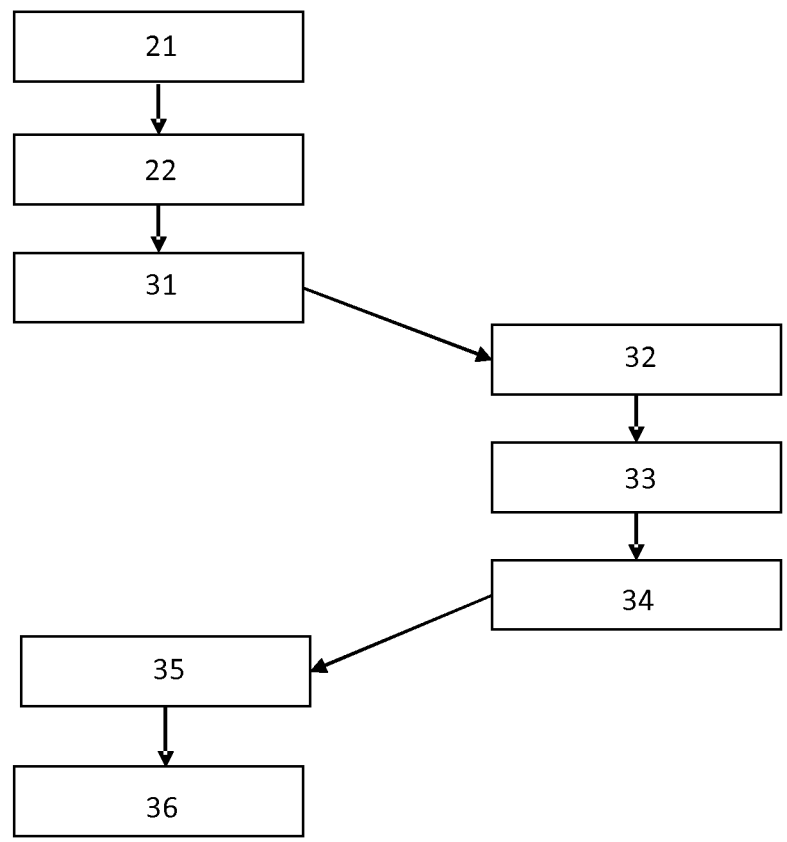
FIG. 3 is a flow diagram of a second embodiment of the methods of associating a mobile device with a group of devices.

In the embodiment of the methods of the invention shown in FIG. 3, a group controller is used to control groups of devices. After step 22 is performed by the mobile device, a step 31 comprises the mobile device sending the identifier to the group controller. A step 32 comprises the group controller receiving the identifier from the mobile device. A step 33 comprises associating the mobile device with the group of devices on a storage means. A step 34 comprises the group controller using a transmitter to facilitate communication between the mobile device and at least one further device from the group of devices. In this embodiment, step 34 comprises sending a list of devices in the group of devices to the mobile device.

A step 35 comprises the mobile device receiving the list of devices in the group of devices from the group controller, therewith confirming that the mobile device has joined the group of devices. After step 35, a step 36 comprises communicating directly with at least one further device from the group of devices, e.g. a further device from the list that was also found using Bluetooth device discovery.

Figure 4:
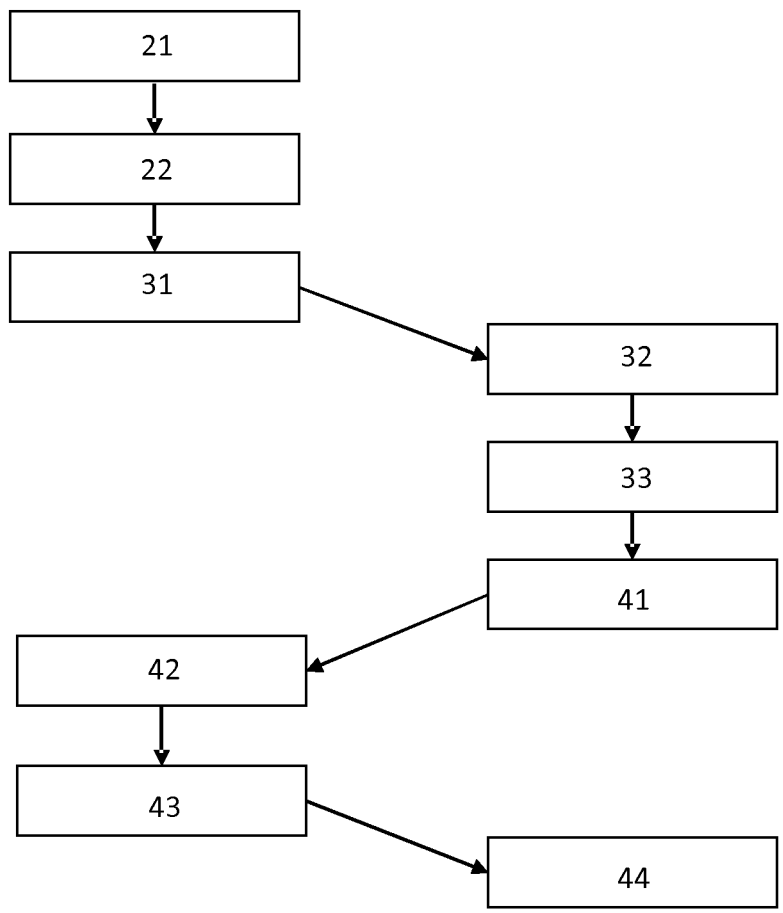
FIG. 4 is a flow diagram of a third embodiment of the methods of associating a mobile device with a group of devices.

In the embodiment of the methods of the invention shown in FIG. 4, a group controller is also used to control groups of devices. However, step 34 is replaced with a step 41 in which the group controller informs the mobile device that it has joined the group of devices. A step 42 comprises the mobile device receiving this message from the group controller. After step 42, a step 43 comprises the mobile device communicating with the at least one further device via the group controller. A step 44 comprises the group controller relaying information from the mobile device to the at least one further device.

Figure 5:
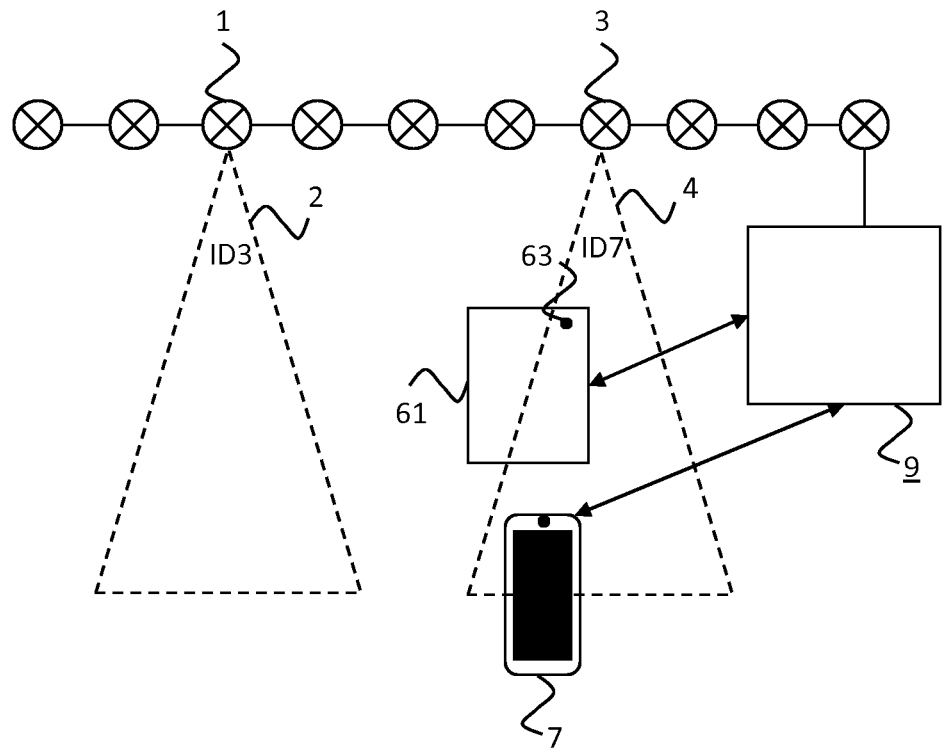
FIG. 5 is a block diagram of a second embodiment of the lighting system.

FIG. 5 shows a second embodiment of the lighting system of the invention. In this second embodiment, a vending machine 61 is connected to the group controller 9. A vending application is executed by the processor 17 of the group controller 9.

A light sensor 63, e.g a diode, of the vending machine 61 determines the light identifier ID7 from the light emission 4 and the vending machine 61 associates itself with the light identifier ID7. The vending application requests all the vending machines to identify themselves and to provide the light identifiers determined by them and verifies that no single light identifier is assigned to more than one machine. The mobile device 7 receives the same light emission 4 as the vending machine 61. When the user wants to order an item, the processor 13 of the mobile device 7 determines the identifier (ID7) from the light emission 4 and transmits it to the group controller 9.

The mobile device user and the vending application want to be sure that only one device is paired with one vending machine. In order to ensure this, the processor 13 of the mobile device 7 is further configured to request an access code for use with vending machine 61 from the group controller 9. The mobile device 7 may receive the access code from the group controller 9 or from the vending machine 61, for example. The mobile device 7 may receive the access code via the light source 3 or via Wi-Fi or Bluetooth, for example.

For example, the mobile device 7 uses a public-private key combination and transmits its public key to the group controller 9. The group controller encrypts the access code using this public key. The light source 3 then emits this encrypted access code. Although the group controller 9 might be able to send the encrypted access code to the mobile device 7 via Wi-Fi or Bluetooth, sending it via the light source 3 ensures that the mobile device 7 is really near the vending machine 61. Mobile device 7 uses its private key to decrypt the access code determined from the light emission 4. This access code is then used by the mobile device 7 for the money transaction and to request an item from the vending machine 61.

Figure 6:
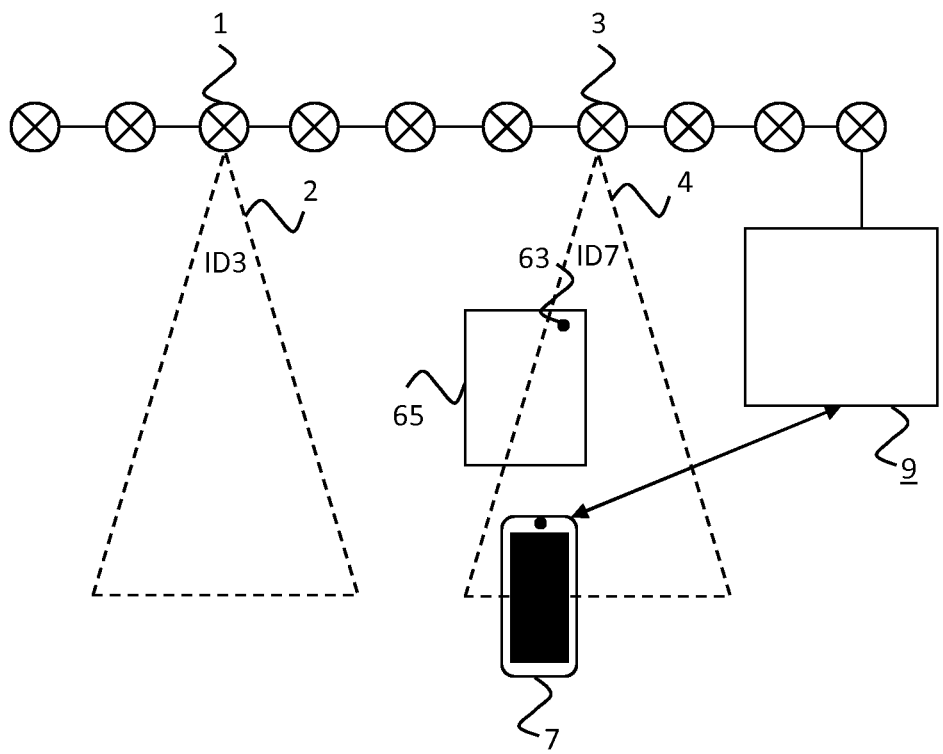
FIG. 6 is a block diagram of a third embodiment of the lighting system.

In the embodiment of the lighting system shown in FIG. 5, the vending machine 61 is able to communicate bidirectionally with the group controller 9, e.g. via Wi-Fi, Bluetooth or Ethernet. In the embodiment shown in FIG. 6, the group controller 9 is not able to communicate with the vending machine 65 via Wi-Fi, Bluetooth or Ethernet, but is only able to communicate with the vending machine 65 via the light source 3 (unidirectionally).

In order to still be able to request a transaction, e.g. to request release of an item, from the vending machine 65, the processor 17 of the group controller 9 is configured to use the transceiver 15 to instruct light source 4 to transmit a different light emission with a transaction request. Measures are known in the art to avoid a replay of a light code to get another item (e.g. by using encrypted transaction numbers between vending application and vending machines). In this embodiment, a person may need to verify manually that no single light identifier is assigned to more than one machine.

This embodiment is ideal for temporary events: the vending machines only need to be able to decode lighting codes via their light sensor. Just by placing the machine under one of the light sources, the group controller is able to select the vending machine the mobile device is aiming at, to authenticate transactions and instruct the nearest vending machine to release the ordered goods. When the machine is moved, another light identifier is received by the mobile device, so the controller simply needs to use another light source, i.e. the light source that emits the light emission now being received by the mobile device, to control the vending machine.

Figure 7:
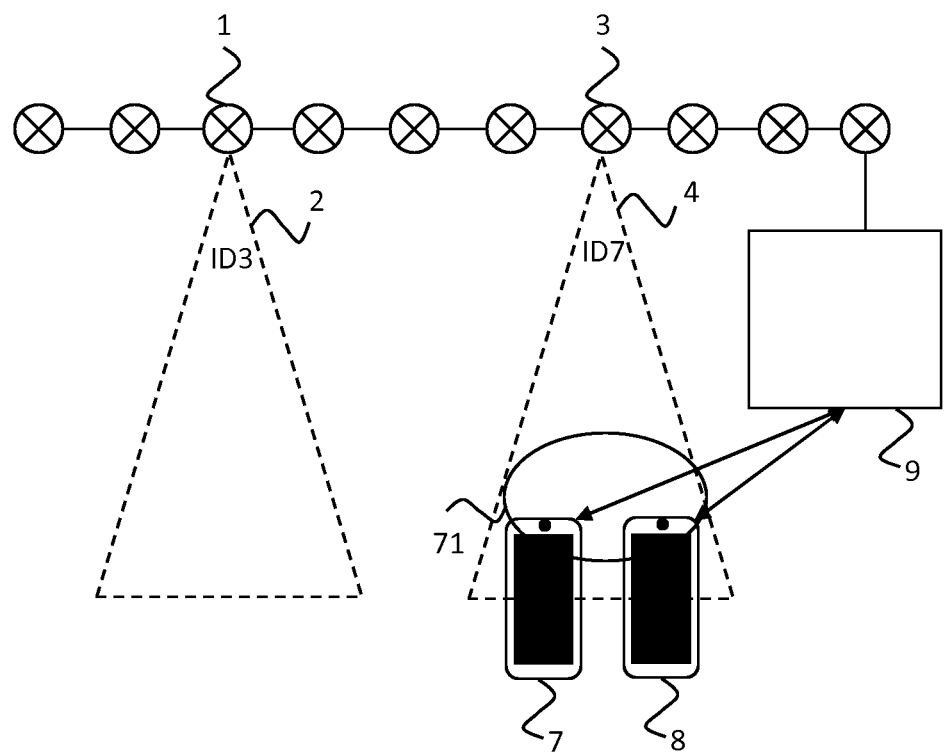
FIG. 7 is a block diagram of a fourth embodiment of the lighting system.

In the embodiment of the lighting system shown in FIG. 7, users gather around a table 71. In this embodiment, the processor 13 of the mobile device 7 is further configured to determine from the light emission which application to start and to start the determined application. During an event, several tables are typically present, each having a unique light identifier. People can join the activity on the table by putting their mobile device on or aiming their mobile device towards the table and reading the light identifier. The activity on the table is supported by an application on the mobile devices. The right application is derived from the light identifier. Example applications are: voting on items discussed on the table, participating in a group game, playing and paying for a casino game. If the application is not yet present on the mobile device 7, the processor 13 of the mobile device 7 may be configured to obtain this application from an application store, e.g. Apple App Store or Google Play Store.

The group controller 9 may be used to perform the authentication of users, to support the exchange of access codes or to verify that users are still present by changing the light identifiers encoded in the light emission(s) shining on the table. When a user leaves the table or hides the mobile device from the lighting, his participation in the group ends.

In a meeting room, it is beneficial to have all light sources in the room emit light emissions with the same identifier so all participants in the room receive the same identifier. Using the described mechanisms of sending a public key via WiFi, performing authentication by the group controller and sending the encrypted access code via the light source, the system ensures that the right person is present and can receive the access code. This may be done, for example, to grant the right person access to the presentation infrastructure.

Figure 8:
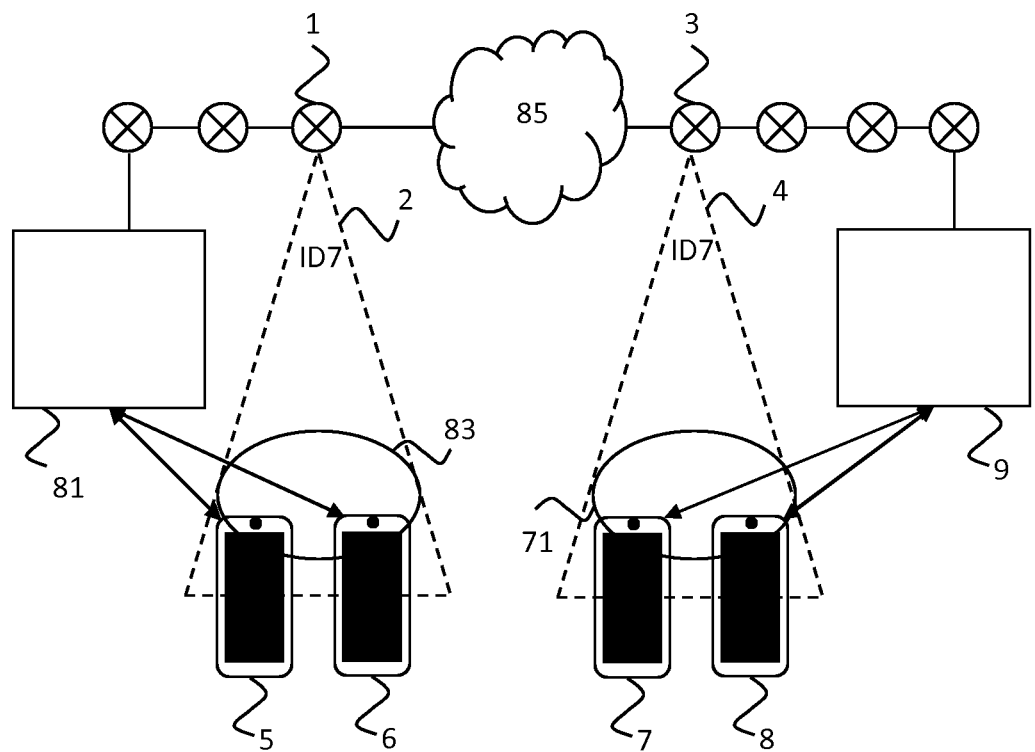
FIG. 8 is a block diagram of a fifth embodiment of the lighting system.

FIG. 8 shows an embodiment of the lighting system in which, instead of one co-located meeting a connected live meeting with for example two teams that are located in different places is happening. In this embodiment, both light source 1 and light source 3 emit a light emission with the same identifier (ID7) in order to create a single connected group. Mobile devices 5 and 6 are located near table 83 and use group controller 81, while mobile devices 7 and 8 are located near table 71 and use group controller 9. However, group controllers 9 and 81 communicate each other via the network 85, e.g. the Internet, and together maintain a single group in which all four mobile devices are present.

Figure 9:
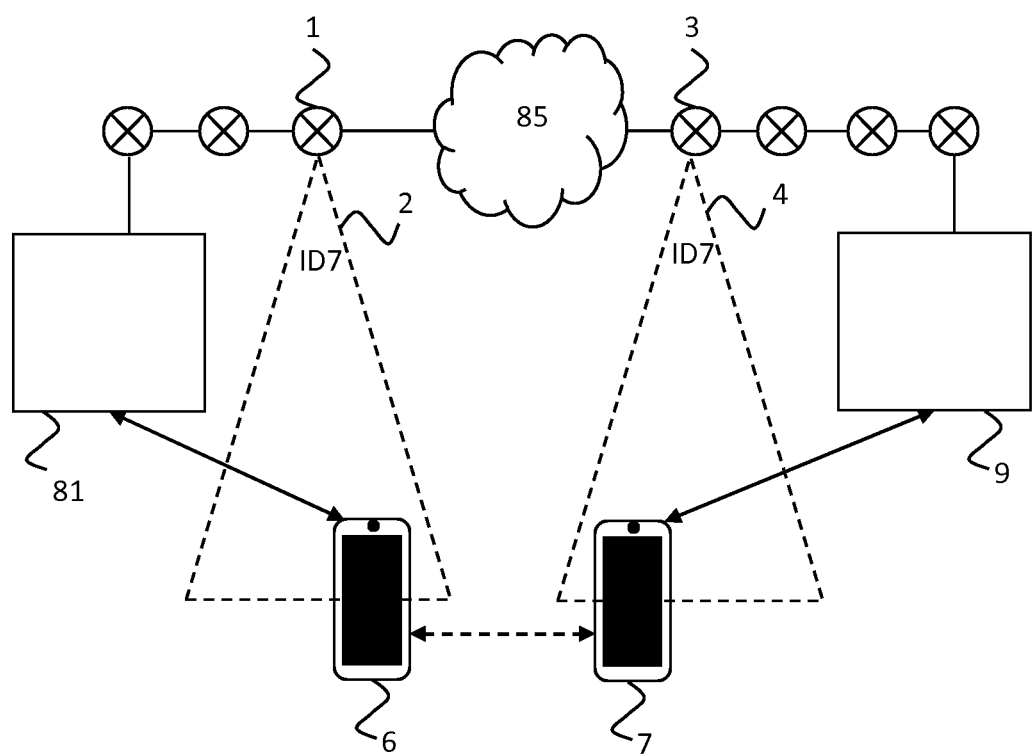
FIG. 9 is a block diagram of a sixth embodiment of the lighting system.

In the embodiment shown in FIG. 9, mobile devices 6 and 7 are in different hot spot areas in public places, but are able connect to each other via group controllers 81 and 9, because light source 1 and light source 3 emit light emissions with the same identifier (ID7).

Figure 10:
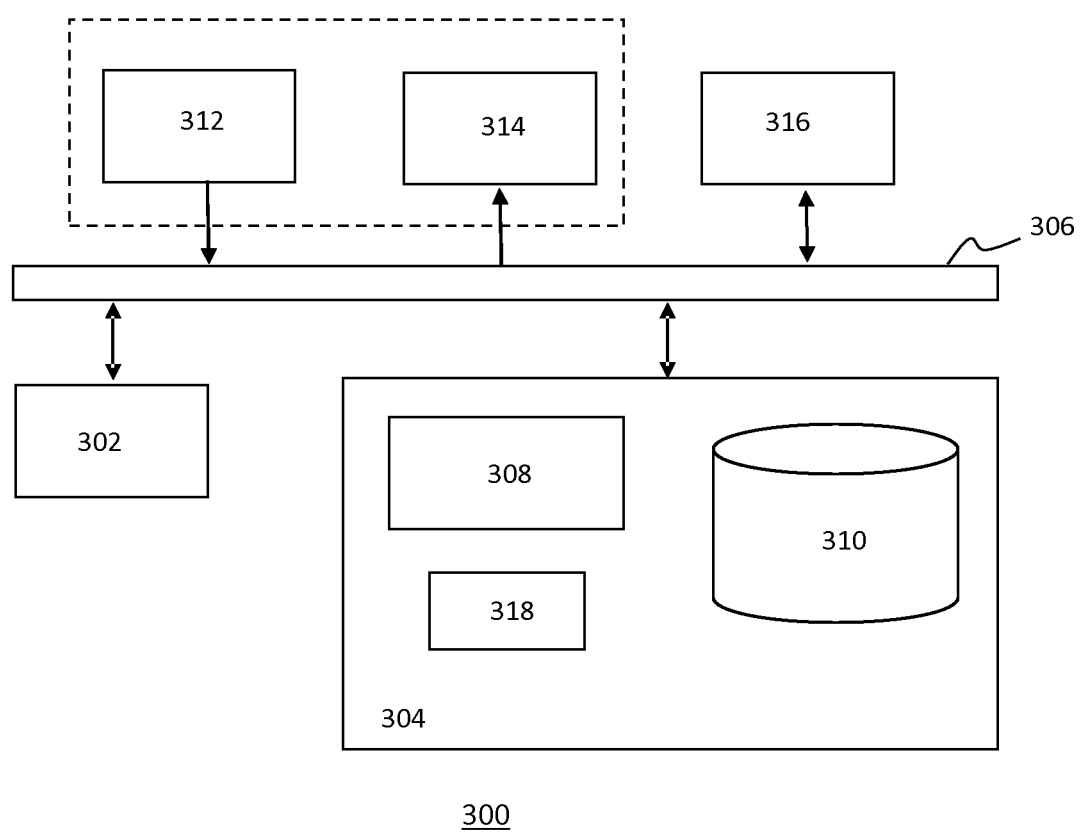
FIG. 10 is a block diagram of an exemplary data processing system for performing the methods of the invention.

FIG. 10 depicts a block diagram illustrating an exemplary data processing system that may perform the methods as described with reference to FIGS. 2 to 4.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A mobile system, comprising:
    a light sensor;
    a communication interface; and
    at least one processor configured to use said light sensor to receive a light emission from a light source, to determine an identifier from said light emission, said identifier being associated with a group of devices, said group of devices comprising mobile devices which are receiving a light emission with said identifier, to join said group of devices, and to use said communication interface to communicate with at least one further device from said group of devices, and
    wherein the at least one processor is configured to leave said group of devices when said light sensor is no longer receiving said light emission with said identifier.

2. A mobile system as claimed in claim 1, wherein said at least one processor is further configured to use said light sensor to receive a further light emission, to determine a further identifier from said further light emission and to leave said group of devices if said further identifier is different from an identifier associated with said group.

3. A mobile system as claimed in claim 1, wherein said at least one processor is further configured to use said communication interface to transmit said identifier to a group controller.

4. A mobile system as claimed in claim 3, wherein said at least one processor is further configured to use said communication interface to receive from the group controller a list of devices which are receiving a light emission with said identifier.

5. A mobile system as claimed in claim 3, wherein said at least one processor is further configured to request an access code for use with said at least one further device from the group controller.

6. A mobile system as claimed in claim 1, wherein said at least one processor is further configured to use said communication interface to receive a foreign identifier from a further device and to join or allow said further device to join a group comprising at least one or more mobile devices of said mobile system and said further device when said identifier and said foreign identifier are equal.

7. A mobile system as claimed claim 1, wherein said at least one processor is further configured to use said communication interface to determine a list of nearby devices and to select one or more devices which are both in said group of devices and in said list of nearby devices.

8. A mobile system as claimed in claim 1, wherein said at least one processor is further configured to determine from said light emission which application to start and to start said determined application.

9. A group controller, comprising:
   a receiver;
   a transmitter;
   storage means; and
   at least one processor configured to use said receiver to receive from a mobile device an identifier determined from a light emission, to associate said mobile device with a group of devices on said storage means, said group of devices being associated with said identifier and comprising no mobile devices which are not receiving a light emission with said identifier, to disassociate said mobile device with said group of devices on said storage means when said mobile device is no longer receiving said light emission with said identifier, and to use said transmitter to facilitate communication between said mobile device and at least one further device from said group of devices.

10. A group controller as claimed in claim 9, wherein said at least one processor is further configured to use said transmitter to send a list of devices which are in said group of devices to said mobile device.

11. A group controller as claimed in claim 9, wherein said at least one processor is configured to use said transmitter to instruct a light source to transmit a different light emission with a different identifier.

12. A group controller as claimed in claim 9, wherein said at least one processor is configured to use said transmitter to instruct a light source to transmit a different light emission with a transaction request.

13. A method of joining a group of devices, comprising the steps of:
   using a light sensor to receive a light emission from a light source;
   determining an identifier from said light emission, said identifier being associated with a group of devices, said group of devices comprising no mobile devices which are not receiving a light emission with said identifier;
   joining said group of devices;
   communicating with at least one further device from said group of devices; and
   leaving said group of devices when said light sensor is no longer receiving said light emission with said identifier.

14. A method of associating a mobile device with a group of devices, comprising the steps of:
   receiving from a mobile device an identifier determined from a light emission;
   associating said mobile device with a group of devices on a storage means, said group of devices being associated with said identifier and comprising mobile devices which are receiving a light emission with said identifier;
   disassociating said mobile device with said group of devices on said storage means when said mobile device is no longer receiving said light emission with said identifier; and
   using a transmitter to facilitate communication between said mobile device and at least one further device from said group of devices.

15. A computer program or suite of computer programs comprising at least one software code portion or a computer program product storing at least one software code portion, the software code portion, when run on a computer system, being configured for enabling the method of claim 13 to be performed.

* * * * *